March 31, 1942.  C. H. H. RODANET  2,277,885
SECURING DEVICE
Filed July 28, 1939   2 Sheets-Sheet 1
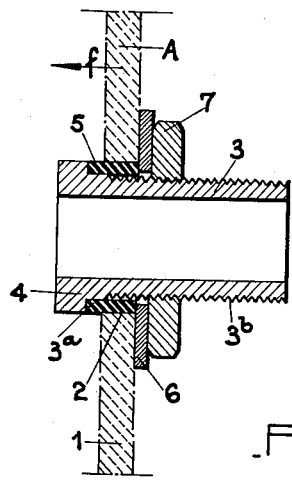
Fig.1.
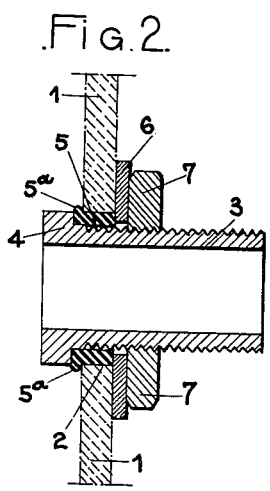
Fig.2.
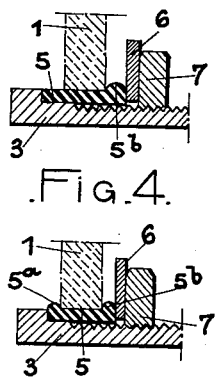
Fig.3.
Fig.4.
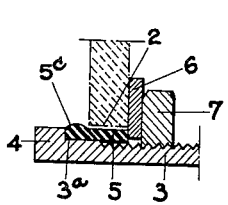
Fig.5.
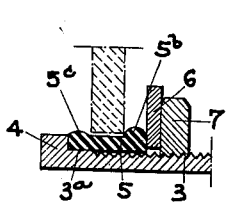
Fig.6.
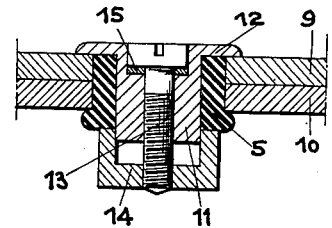
Fig.7.
INVENTOR:
CHARLES HILAIRE HENRI RODANET
BY Haseltine, Lake & Co.
ATTORNEYS Patented Mar. 31, 1942

2,277,885

UNITED STATES PATENT OFFICE 2,277,885

SECURING DEVICE

Charles Hilaire Henri Rodanet, Neuilly-sur-Seine, France, assignor to Société Anonyme: Jaeger-Aviation, Levallois-Perret, France Application July 28, 1939, Serial No. 287,064
In France August 5, 1938

2 Claims. (Cl. 85—2.4)

The present invention has for main object a securing device.

A long time ago the use of the properties of rubber or similar materials was thought of for providing securing devices which can be easily taken to pieces. For instance, for securing the handles on the handle-bars of cycles and motor cycles, it has already been proposed to introduce within the tube forming the handle-bar, a rubber ring which is clamped after assemblage, between the bottom of the handle externally secured on the tube and the inner head of a screw the nut of which can be operated from the exterior. An axial pressure is thus exerted on the rubber which, owing to the double property of resiliency and incompressibility of said material determines the diametral expansion of the ring and causes it to be pressed, under a high pressure, against the inner cylindrical wall of the tube. It is the adherence thus obtained between the rubber and the tube which effects the securing, and in this device is found a new application of older plugs, devised in a similar manner, but in which the diametral expansion of the rubber under the action of an axial pressure serves to ensure, not the securing, but the fluid-tightness of the plug. In both cases, moreover, the extraction is very easy, as it obviously suffices to loosen the nut for eliminating the diametral pressure and consequently the adherence.

Securing devices of this kind have a disadvantage which consists in the fact that the wrenching stress which they can withstand is necessarily limited by the adherence of the rubber on the wall where it is pressed by its diametral expansion.

Now, this adherence is not only function of the pressure axially exerted on the rubber, but also of the lateral surface of contact; it results therefrom that when said surface is small, as is the case when the wall on which the securing is effected is relatively thin, the resistance to wrenching is also small.

For remedying this inconvenience, the invention contemplates considerably increasing said resistance to wrenching by a flange belonging to the body of rubber and preventing its extraction when said body is under an axial pressure; and it is essential to note that the presence of said flange in securing position must not hinder the unilateral introduction and extraction (that is to say always on the same side of the wall, the other side being assumed to be inaccessible) when the radial pressure is eliminated.

For solving the problem which consists in ensuring the resistance to wrenching, not only by the adherence of the rubber, but also by a flange of the latter without prejudice to the ease of assemblage and unilateral removal, the invention makes use of one or the other of two different means.

A first means consists in the combination of a rod having a head, and of a ring made of rubber or similar resilient material, mounted on said rod and having an external diameter which allows the whole to be introduced with friction, the head of the rod first, in a hole perforated in the securing wall, the length of the rubber ring being greater than the thickness of the wall so as to project on the internal face; whereas a nut (or a screw), if need be combined with a bearing washer, allows the axial clamping of the rubber.

Fig. 1 is a cross section of an embodiment of the securing device, the parts being loosely assembled.

Fig. 2 is the same as Fig. 1, the parts being tightened.

Figs. 3 and 4 are views similar to Figs. 1 and 2, respectively, of a slight modification thereover.

Figs. 5 and 6 represent further modifications of Fig. 1, the parts being loosely assembled.

Fig. 7 is a cross section of the device employing a closure means.

Figure 8:
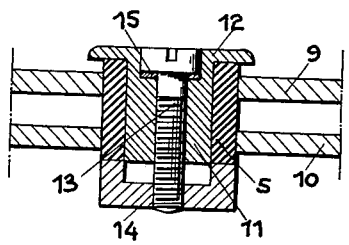

Figs. 8 to 13, inclusive, show the device as applied to spaced plates, in several modifications.

Fig. 1 of the accompanying drawings relates to an embodiment of this first means.

In this figure, the wall on which the securing is to be effected is shown at $1$. Said wall is perforated with a cylindrical hole $2$. According to the invention, the rod $3$, which forms a part of the securing device, is provided with a head $4$, also cylindrical, the diameter of which is scarcely smaller than that of the hole $2$; as a rule, the difference in diameter between the head $4$ and the hole $2$ is just sufficient for allowing the easy passage of said head $4$ through the hole $2$, as will be explained later on.

The rod $3$ preferably comprises, below the head $4$, a smooth part $3^a$ of smaller diameter, then a screw threaded part $3^b$. On the smooth part $3^a$ is placed a ring $5$ made of rubber or other resilient material, the length of which is greater than the thickness of the wall $1$. Preferably, the ring $5$ has an internal diameter which is slightly smaller than the diameter of the smooth part $3^a$, in such a manner that for adapting the ring $5$ on the rod $3$, it is necessary to slightly extend the rubber; but, of course, this arrangement is not essential. The external diameter of the ring $5$ is also, preferably, slightly greater than the diameter of the hole 2, so that the passage of the ring 5 through the hole 2 takes place with slight friction. It is to be understood that the invention would not be departed from if said friction instead of being slight, was more considerable, or even null.

The securing device is completed by a ring or washer 6 adapted to press against the wall 1, and by a nut 7 which screws on the screw threaded part 3$^b$ of the rod 3.

For effecting the assemblage, the rod 3, rubber ring 5, washer 6 and nut 7 are first assembled as shown in Fig. 1, that is to say without axially crushing the rubber ring 5. Then the head 4 of rod 3 can be introduced through the hole 2, in the direction of the arrow F, assuming that the face A of the wall 1 is accessible, the face B being assumed to be inaccessible. When the washer 6 has come in contact with the wall 1, the nut 7 is rotated in the tightening direction. It is easy to prevent the rod 3 from rotating, and moreover, if, according to what has been stated above, the rubber ring 5 has been introduced with friction in the hole 2, said friction suffices to prevent the rotation of rod 3. The ring 5 is then subjected to an axial crushing and as rubber is a body which is incompressible, the reduction of the length of the ring 5 must obviously be compensated by an increase in its thickness. Now, within the hole 2, the rubber can obviously be subjected to no expansion. It results therefrom that the rubber flows between the head 4 and the wall 1 and forms the bead 5$^a$ which is clearly shown in Fig. 4, said bead forming a circular abutment which prevents wrenching, the wrenching stress being assumed, of course, to be in reverse direction to the arrow $f$. The stresses directed in the direction of the arrow $f$ are absorbed by the washer 6 and the nut 7.

As previously pointed out, the resistance to wrenching stresses exerted in reverse direction to the arrow $f$ is ensured not only by the adherence of the rubber ring 5 within the nut 2, but also by the presence of the bead 5$^a$, which is automatically created by tightening the nut 7. The strength of said securing device is very great. Moreover, as will be easily understood, it ensures perfect fluid-tightness.

Finally, the connection thus obtained is obviously resilient, and prevents the transmission of vibrations. Moreover, it will be noted that the rubber of ring 5 constitutes a kind of spring under permanent pressure, ensuring an excellent braking of the nut 7 which, in this manner, has absolutely no tendency to loosen notwithstanding the vibrations which might succeed in spite of all, in being transmitted.

Moreover, the resilient insulation can be further increased, by not completely pushing in the device, when it is not yet under tension, so that a bead is formed not only at 5$^a$ as illustrated in Fig. 2, but also between the wall 1 and the washer 6. A flange or bead 5$^b$ can even be provided on the rubber ring 5, as shown in Fig. 3. In this case, as seen in Fig. 4, the rod 3 would be completely insulated from the wall 1 by the rubber ring 5 without any metallic contact existing between elements 1 and 3.

In the first means which has just been described, the abutment 5$^a$ did not exist before tightening the nut 7, it no longer exists when the nut 7 is loosened; it results therefrom that the assemblage and taking to pieces offers absolutely no difficulty. However, there is another means for obtaining results similar to those given by the first means, whilst reducing however the facility of assemblage and taking to pieces. This second means consists in the fact that the rubber ring comprises, by the side of the head of the rod, a flange forming abutment, the external diameter of which is clearly greater than the diameter of the securing hole, without this difference of diameter preventing however the introduction of the rubber ring through said hole, by distorting the abutment, and causing the rubber to flow parallel to the axis, at the moment the introduction in the hole, or the extraction therefrom are effected; whereas, on the contrary, when the rubber ring is under axial compression, the previously mentioned abutment is opposed to the wrenching stress.

Figs. 5 and 6 illustrate this second means, in two modifications.

Fig. 5 is similar to Fig. 1, but the difference consists in the fact that the ring 5 is provided, in the part adjacent to the head 4, with a flange adapted to form the abutment, and which is illustrated at 5$^c$. Said flange has a diameter greater than the hole 2, but the introduction thereof in said hole is not prevented because the material constituting said flange 5$^c$, subjected to a radial pressure when it is introduced in the hole 2, can flow axially. On the contrary, when the tightening of nut 7 is effected, it is obvious that, even under the stress of a violent wrenching, the material of the flange 5$^c$ can no longer be rolled between the hole 2 and the part 3$^a$, because any axial flow of the rubber is henceforth prevented.

Fig. 6 is quite identical to Fig. 7 with the sole difference that for the rubber washer 5 has been provided, not only the flange 5$^c$ of Fig. 7, but also the flange 5$^b$ of Fig. 5.

The securing device which has just been described can receive a great number of applications which are all included in the scope of the invention; it is even obvious that it can serve not only for securing the rod 3 on a wall 1, but also if desired, for securing one on the other a plurality of plates or sheet metal members similar to 1. For that purpose, it is sufficient for said plates to be perforated with holes similar to 2, for said holes to approximately coincide, and for the ring 5 to have a length greater than the total thickness of the assembled plates or sheet metal members.

Fig. 7 illustrates an embodiment of this type in which the sheet metal plates or members to be united are shown at 9 and 10. In this example, the rubber ring 5 is mounted on the rigid cylindrical member 11 provided with a head 12 and is traversed by the screw 13 the nut or end member 14 of which, having an external diameter allowing it to just pass through the holes of the sheet metal members, presses against the end of the rubber, as illustrated. A packing 15 of fibre or other plastic material is arranged between the head of the screw 13 and the member 11. This arrangement given by way of example, can also serve as fluid-tight and impervious packing, for instance in aeroplanes.

Figure 9:
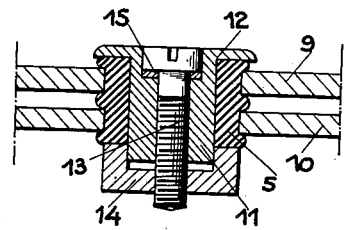
Figure 10:
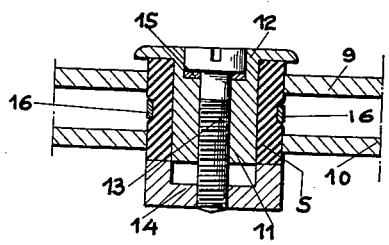
Figure 11:
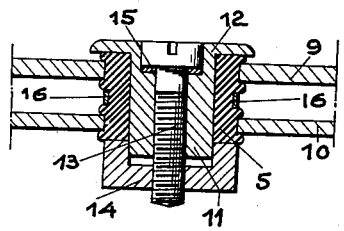

The sheet metal plates 9 and 10 can, of course, not be in contact; Fig. 8 shows an example of this arrangement, in loosened condition, whereas Fig. 9 shows the same in tightened condition. In this case, it is obvious that the sheet metal plates 9 and 10 are secured on each other without metallic contact, the rubber being interposed between them.

Figure 12:
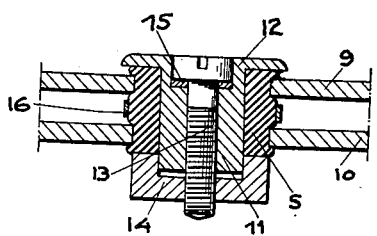

In the case in which the sheet metal plates 9 and 10 are rather far from each other, a ring 16 forming a hoop could be arranged which is of the same size as the hole (Figs. 10 and 11) or larger (Fig. 12). In the first case, two internal beads would be formed, whereas in the second case, one bead only would be formed but with bearing surfaces on the improved sheet metal plates.

Figure 13:
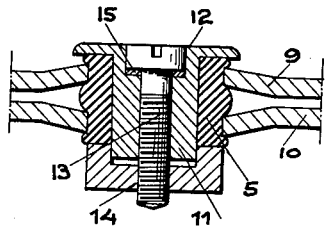

The orifices of the holes might be bulged, as shown in Fig. 13, and their edges softened by a bevel or a rounded bead; all these detail modifications are obviously included in the scope of the present invention.

What I claim as my invention and desire to secure by Letters Patent is:

1. A securing device for securing one or more panel means or the like, including a rigid cylindrical member having a shank adapted to extend through an aperture in said panel means and a head or shoulder upon one end of larger diameter than that of said hole and adapted to bear against one side of the panel means around the hole, a tubular member of resilient material with a diameter substantially similar to that of said hole and mounted upon the shank of said cylindrical member, a screw extending axially through said cylindrical member and having means for retaining the head of the latter against said panel means, and a nut for said screw of smaller exterior diameter than that of the hole and having means for receiving and guiding the end of the shank of said cylindrical member.

2. A securing device according to claim 1, in which the means upon the nut for receiving the end of the shank of the cylindrical member includes a cylindrical cavity of sufficient diameter to allow said nut to slide in upon said end of said shank and virtually form a cap therefor.

CHARLES HILAIRE HENRI RODANET.